May 25, 1965 H. UR 3,185,860

BISTABLE DEVICE

Filed April 20, 1960

INVENTOR.
HANOCH UR
BY John V. Regan
ATTORNEY 3,185,860
Patented May 25, 1965

3,185,860

BISTABLE DEVICE

Hanoch Ur, Camden, N.J., assignor to Radio Corporation of America, a corporation of Delaware Filed Apr. 20, 1960, Ser. No. 23,531
12 Claims. (Cl. 307—88.5)

This invention relates to bistable devices and, more particularly, to a bistable counter circuit employing a two terminal device having a volt-ampere characteristic with a negative resistance portion.

A bistable device may be defined as a circuit or element having two stable operating states and requiring two input pulses to complete a cycle of operation. The device remains in either stable state until caused to change to its other stable state, as for example, by the application of a proper input signal. A single stage binary counter, or triggerable flip-flop, generally has a single trigger input terminal. Successive input pulses of the proper polarity applied at that input terminal cause the counter, or flip-flop to change states alternately.

It is an object of this invention to prived a novel flip-flop circuit.

It is another object of this invention to provide a novel triggerable flip-flop, or single stage binary counter.

It is still another object of this invention to provide a triggerable flip-flop which has low power requirements and which embodies a reduced number of components.

Yet another object of this invention is to provide a triggerable flip-flop which has the characteristics described aforesaid and which employs a two terminal, negative resistance device as the sole active element.

These and other objects of the present invention are accomplished by the series combination of an inductor and a two terminal device having capacitance between its terminals and having a volt-ampere characteristic with a negative resistance portion. Means are provided for biasing said device for bistable operation. The inductance has a value such that the circuit is underdamped when biased in one of the stable states. Successive input pulses of one polarity are effective to switch the device from one stable state to the other alternately.

In the accompanying drawing like reference characters refer to like components and:

Figure 1:
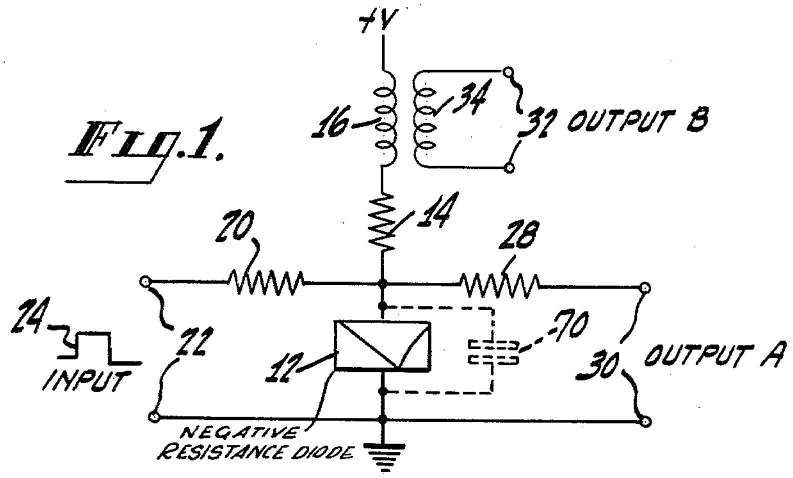
FIGURE 1 is a schematic diagram of a bistable counter or triggerable flip-flop according to the invention.

The preferred form of bistable circuit according to the invention is illustrated schematically in FIGURE 1. The circuit includes a two terminal, negative resistance device 12 connected in series with a resistor 14 and an inductor 16 between a point of reference potential, which may be circuit ground, and one terminal of a biasing source, designated +V. The biasing source may be, for example, a battery and a voltage divider network having one terminal connected to circuit ground. A resistor 20 is connected between the ungrounded terminal of the negative resistance device 12 and the ungrounded one of a pair of input terminals 22. Input pulses 24 of one polarity are applied selectively across the input terminals 22 from a source (not shown). The input pulses 24 may be current or voltage pulses. In the latter event, the input resistor 20 has such value as to make the pulses 24 appear as current pulses to the device 12.

Another resistance element 28 is connected between the ungrounded terminal of the negative resistance device 12 and the ungrounded one of a pair of output terminals 30. An output may also be derived at a pair of output terminals 32 which are connected, respectively, to opposite ends of a transformer secondary winding 34. In the latter event, the inductor 16, connected in series with the negative resistance diode 12, functions inter alia as a transformer primary winding. Other functions of the inductor 16 will be apparent from a later description.

Figure 2:
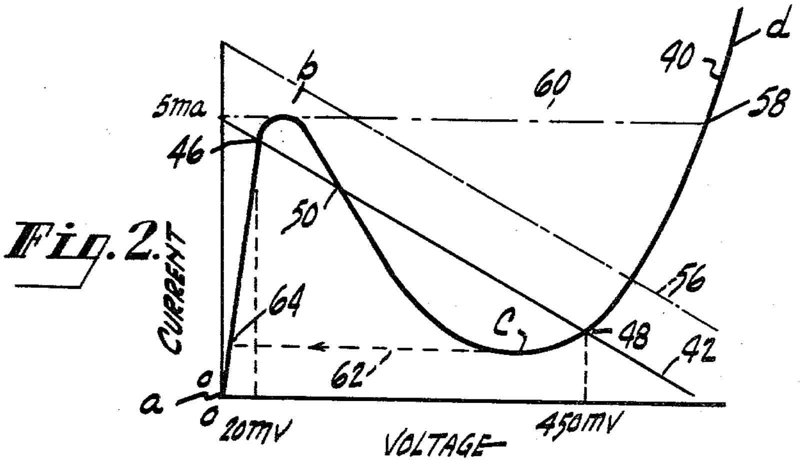
FIGURE 2 is a characteristic curve of one type of negative resistance device, which curve is useful in explaining the operation of the circuit of FIGURE 1.

The negative resistance device 12 may be, for example, a negative resistance diode of the type described in the article by H. S. Sommers, Jr., in the Proceedings of the IRE, July 1959, at page 1201, and in other publications, and known generally in the art as a "tunnel diode." The characteristics of such a diode are fully set forth in the aforementioned article and will not be described here in detail. The negative resistance diode 12 may have a volt-ampere characteristic 40 as illustrated in FIGURE 2. In FIGURE 2, voltage is plotted along the abscissa and the current through the negative resistance diode 12 is plotted along the ordinate. The particular values of voltage and current given in FIGURE 2 are by way of illustration only and constitute no limitation of the present invention. The current range, for example, may vary from one diode to another. The portions *ab* and *cd* of the curve 40 are regions of positive resistance, that is to say, the inverse of the slope has a positive value in these regions. More particularly, the incremental resistance, $\Delta V/\Delta I$ has a positive value in the regions *ab* and *cd*. The portion *bc* is a region of negative resistance.

In the FIGURE 1 circuit, the value of the series resistor 14 is selected so that the negative resistance diode 12 has a load line 42 of the general type illustrated in FIGURE 2. This load line 42 intersects the positive resistance regions *ab* and *cd* at points 46 and 48, respectively. Such intersecting points are points of stable operation corresponding to the two stable states of operation of the negative resistance diode 12. The load line 42 also intersects the negative resistance region *bc* at a point 50, which is a point of unstable operation. The stable operating point 48 of high voltage may represent storage of a binary "one," and the stable operating point 46 of low voltage may represent storage of a binary "zero."

Assume that the negative resistance diode 12 is operating initially in the low voltage state corresponding to the point 46 of intersection of the load line 42 with the positive resistance region *ab*. The diode 12 may be switched to the high voltage state by a positive input pulse 24 applied at the input terminals 22. The input pulse 24 has preferably a fast rise time and is adjusted to have an amplitude sufficient to raise the load line 42 above the peak *b* of the characteristic curve 40, for example, to the position occupied by the dashed load line 56. The diode 12 remains in a low voltage state so long as the current through the diode 12 does not exceed a critical value corresponding to point *b*. When the current is increased above the critical value, the diode 12 switches rapidly through the negative resistance region to a point of high voltage. The diode 12 may switch along a constant current line, such as the line 60, because of the action of the inductor 16, and the current through the diode 12 then diminishes to a value corresponding to the point of intersection of the load line and the portion *cd*. The input pulse 24 is a pulse of short duration which terminates preferably before switching of the diode 12 is complete, that is to say, before the current reaches a steady value. The inductive time constant is short because of the value of the series resistor 14 relative to the inductance 16, and the stable operating point 48 is reached rapidly.

The current through the diode 12 increases again along the portion *cd* in response to the next applied input pulse 24. Upon termination of this second input pulse, the current through the diode 12 decreases toward the stable operating point 48. Under certain conditions, as described hereinafter, the current overshoots the point 48 and decreases to a value lower than the valley of characteristic curve 40. The diode 12 then switches to the low voltage state, for example, along the dotted line 62 to a point 64, and then rises to a value corresponding to the point 46 of stable operation.

It is believed that switching from the high state to the low state occurs as follows. If the capacitance across the diode 12, which may be inherent, has a value such that the inductive and capacitance time constants are of the same order, the circuit is underdamped, and overshoot results. The inductive time constant generally is the same for both the high and low voltage states because of the fixed resistor 14. The capacitive time constant, however, has a different value in the regions of the two stable operating points. As may be seen from the curve 40, the resistance of the diode 12 has a relatively low value in the region about the point 46, and a relatively high value in the region about point 48. If the resistance of the diode 12 in the high state is such that the capacitive time constant and inductive time constant are of the same order, the system is underdamped and a current overshoot results to provide switching. It is believed that switching is enhanced by a slight differentiation of the input signal 24. A capacitor 70 may be connected in parallel with the diode 12 if necessary to provide the proper capacitance for switching. Circuit parameters are selected so that the inductive and capacitive time constants are short compared to the repetition rate of the input pulse 24.

Figure 3:
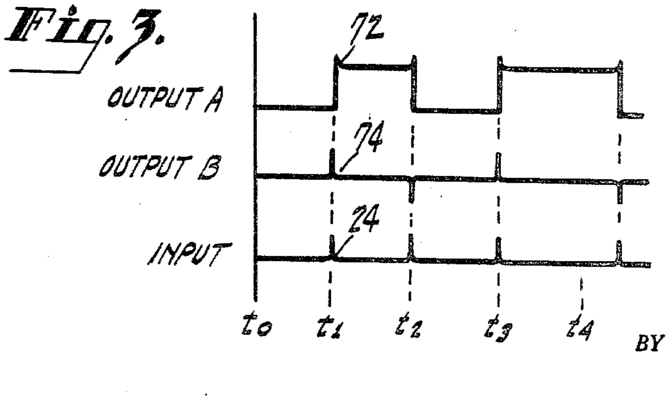
FIGURE 3 is a set of waveforms for the FIGURE 1 circuit.

FIGURE 3 is a set of waveforms which illustrates the input and output signals for the FIGURE 1 circuit. It is assumed that the diode 12 is operating in the low voltage state at $t_0$. The first positive pulse 24 is applied at the input terminals 22 at $t_1$. The diode 12 is switched to the high voltage state in response to the imput pulse. The peak of the spike 72 on the output waveform may correspond, for example to the point 58 of intersection of the line 60 with the characteristic curve 40. The pulse of voltage at the output terminals 32 is occasioned by the counter E.M.F. generated in the inductor 16. This output 74 is of short duration because of the short inductive time constant.

The diode 12 continues to operate stably in the high voltage state until the second input pulse 24 is applied at $t_2$. The voltage across the diode 12 first rises slightly in response to the input pulse and then drops to a low value because of the aforementioned overshoot. The output at the terminals 32 is reversed in response to the second input pulse because of the polarity of the counter E.M.F. of the inductor 16. Each succeeding input pulse 34 triggers the diode 12 from one stable state to the other. The input pulses 24 may occur at random, as illustrated in FIGURE 3.

What has been shown and described is a single stage, binary counter which may be operated, for example, as a "scale of two." It will be apparent to one skilled in the art that several such stages may be cascaded to provide a scale of "$n$" counter. The counter has the advantage, among others, that the negative resistance device 12 is capable of very high switching speed and is not limited by carrier storage, as are transistors. An additional advantage of this counter circuit is the reduced number of components.

What is claimed is:

1. The combination comprising a two terminal device having capacitance between the terminals and having a volt-ampere characteristic with a negative resistance portion; a transformer primary winding and a voltage source serially connected with said device in a direct current path; means for biasing said device for operation as a bistable element; pulse input means connected across said device for selectively supplying input pulses of a single one polarity having a duration less than the full switching time of said device from one stable state to the other; a pair of output terminals; and a secondary winding of the transformer connected between said output terminals.

2. A bistable circuit comprising the series combination of a negative resistance diode, an inductor, a resistor and a voltage source, said resistor and said source having values such that said diode is biased for operation as a bistable element; a capacitor connected in parallel with said diode and having a value such that the inductive and capacitive time constants of said circuit are of the same order when said diode is in one of its two stable states; and pulse input means connected across said diode for applying input pulses of one polarity for switching said diode, each of said pulses having a duration less than the full switching time of said diode from one stable state to the other.

3. The bistable circuit as claimed in claim 2, wherein said input pulses have the proper polarity for switching said diode to said one stable state from the other stable state, and wherein said input pulses have sufficient magnitude to cause an overshoot in diode current of the opposite polarity and of switching amplitude when applied when said diode is in said one state.

4. The bistable circuit claimed in claim 2, including means for deriving output signals from said circuit.

5. The combination as claimed in claim 4 including output means connected across said diode.

6. The combination as claimed in claim 4 wherein said inductor is the primary winding of a transformer, and wherein said output means is a transformer secondary winding.

7. A bistable circuit comprising: a negative resistance diode having capacitance between its terminals, said diode having a volt-ampere characteristic characterized by two regions of positive resistance separated by a region of negative resistance; a resistor connected to said diode; means biasing said diode through said resistor so that the quiescent load line intersects both of said two regions of positive resistance; an inductor connected in series with said diode and said resistor and having such a value of inductance that the inductive and capacitive time constants of the circuit are of the same order when said diode is in one of its stable states; and means for selectively applying pulses of a single one polarity across said diode having a duration less than the switching time of said diode and an amplitude greater than the required switching amplitude.

8. A bistable circuit comprising: a negative resistance diode having capacitance between its terminals, said diode having a volt-ampere characteristic characterized by two regions of positive resistance separated by a region of negative resistance; a resistor connected to said diode; means biasing said diode through said resistor so that the quiescent load line intersects both of said two regions of positive resistance; an inductor connected in series with said diode and said resistor and having such a value of inductance that the circuit is underdamped when said diode is in one of its two stable states; and means for selectively applying pulses of a single one polarity across said diode having a duration less than the switching time of said diode and a magnitude sufficient to cause an overshoot in diode current opposite in polarity to said one polarity and greater than the switching amplitude of said diode.

9. A bistable circuit comprising: a negative resistance diode having capacitance between its terminals, said diode having a volt-ampere characteristic characterized by two regions of positive resistance separated by a region of negative resistance; a resistor connected to said diode; means biasing said diode through said resistor so that the quiescent load line intersects both of said two regions of positive resistance; an inductor connected in series with said diode and said resistor and having such a value of inductance that the circuit is underdamped when said diode is in one of its two stable states; and means for selectively applying pulses of a single one polarity across said diode.

10. A bistable trigger circuit comprising: a negative resistance diode having capacitance between its terminals and having a volt-ampere characteristic defined by two regions of positive resistance separated by a region of negative resistance; a resistor and an inductor serially connected with said diode; means quiescently biasing said diode to have a first stable operating state and a second stable operating state, said diode being triggerable from the first to the second stable state in response to a current pulse of first polarity and first amplitude; means for selectively applying input current switching pulses of said one polarity successively to said diode, said pulses having at least said first amplitude and having a duration which is less than the switching time of said diode from one stable state to the other, said inductor having such a value that the circuit is underdamped an amount sufficient to cause an overshoot in diode current of a polarity opposite said first polarity in response to an imput pulse of said first polarity applied when said diode is in said second state.

11. The circuit as claimed in claim 10 wherein said diode is a tunnel diode.

12. The circuit as claimed in claim 10 wherein the bias means is connected across the series combination of said diode, said resistor and said inductor.

References Cited by the Examiner

UNITED STATES PATENTS

| | | | |
|---|---|---|---|
| 2,565,497 | 8/51 | Harling | 307—88.5 |
| 2,713,132 | 7/55 | Matthews | 307—88.5 |
| 2,843,765 | 7/58 | Aigrain | 307—88.5 |
| 2,944,164 | 7/60 | Odell et al. | 307—88.5 |

JOHN W. HUCKERT, *Primary Examiner.*

HERMAN KARL SAALBACH, *Examiner.*